US011630408B2

(12) United States Patent
Araki

(10) Patent No.: US 11,630,408 B2
(45) Date of Patent: Apr. 18, 2023

(54) APPARATUS AND METHOD FOR ADJUSTING OUTPUT VALUE OF OPTICAL SENSOR HAVING LIGHT-RECEIVING ELEMENT THAT RECEIVES REGULARLY-REFLECTED LIGHT AND DIFFUSELY-REFLECTED LIGHT

(71) Applicant: CANON KABUSHIKI KAISHA, Tokyo (JP)

(72) Inventor: Ryuichi Araki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 17/242,045

(22) Filed: Apr. 27, 2021

(65) Prior Publication Data

US 2021/0341866 A1 Nov. 4, 2021

(30) Foreign Application Priority Data

Apr. 30, 2020 (JP) ............................ JP2020-080691

(51) Int. Cl.
*H04N 1/00* (2006.01)
*G03G 15/00* (2006.01)

(52) U.S. Cl.
CPC . *G03G 15/5041* (2013.01); *G03G 2215/0407* (2013.01)

(58) Field of Classification Search
None
See application file for complete search history.

(56) References Cited

U.S. PATENT DOCUMENTS 7,940,418 B2 * 5/2011 Eom .................. G03G 15/5058 358/1.18
8,301,049 B2 * 10/2012 Omelchenko ...... G03G 15/0131 399/49
2012/0106997 A1 * 5/2012 Aoki .................. G03G 15/5054 399/49
2014/0300887 A1 * 10/2014 Yamamoto ............ G01S 7/4868 356/5.01
2015/0093131 A1 * 4/2015 Taishi ....................... G01J 1/44 399/49
2017/0131657 A1 * 5/2017 Monden ............... G03G 15/556
2018/0173145 A1 * 6/2018 Nakazato ........... G03G 15/5062

FOREIGN PATENT DOCUMENTS

JP 2011-107613 A 6/2011
JP 2013-120215 A 6/2013
JP 2013120215 A * 6/2013

* cited by examiner

*Primary Examiner* — Dung D Tran
(74) *Attorney, Agent, or Firm* — Canon U.S.A., Inc. IP Division

(57) ABSTRACT

An optical sensor comprises a first light-emitting element, a second light-emitting element, a light-receiving element, a first amplifier circuit and a second amplifier circuit. The light-receiving element receives reflected light from an object to be measured, and outputs an output value on the basis of a light receiving result of the light-receiving element. The amplifier circuits amplifies the output value output from the light-receiving element.

8 Claims, 11 Drawing Sheets

APPARATUS AND METHOD FOR ADJUSTING OUTPUT VALUE OF OPTICAL SENSOR HAVING LIGHT-RECEIVING ELEMENT THAT RECEIVES REGULARLY-REFLECTED LIGHT AND DIFFUSELY-REFLECTED LIGHT

BACKGROUND

Field of the Disclosure

The present disclosure relates to a technique for adjusting output values of a plurality of light-receiving elements.

Description of the Related Art

An image forming apparatus forms a test pattern on a transfer member in order to correct the density of a toner image, the formation position of the toner image, and the like. Japanese Patent Laid-Open No. 2013-120215 proposes detecting regularly-reflected light for a black toner pattern, and detecting diffusely-reflected light (called "diffuse light" hereinafter) for yellow, magenta, and cyan toner patterns. Japanese Patent Laid-Open No. 2011-107613 describes a sensor that includes two light-emitting elements and one light-receiving element, and can selectively receive regularly-reflected light and diffuse light. Specifically, when a first light-emitting element is turned on and a second light-emitting element is turned off, the light-receiving element receives regularly-reflected light. When the first light-emitting element is turned off and the second light-emitting element is turned on, the light-receiving element receives diffuse light.

Incidentally, the two light-emitting elements have individual differences in the manufacturing process. As such, even if the same current flows to both the first light-emitting element and the second light-emitting element, the light emission intensity of the first light-emitting element will not match the light emission intensity of the second light-emitting element. Individual differences also arise among light-receiving elements in the manufacturing process. If the sensitivities of the light-receiving elements are adjusted on the basis of the diffuse light, the detection signal will saturate when regularly-reflected light is received. On the other hand, if the sensitivities of the light-receiving elements are adjusted on the basis of the regularly-reflected light, the S/N ratio of the diffuse light will drop.

SUMMARY

The present disclosure provides an optical sensor comprising: a substrate having a predetermined surface facing an object to be measured; a first light-emitting element provided on the predetermined surface of the substrate, wherein the first light-emitting element emits light to the object to be measured, and the predetermined surface faces the object to be measured; a second light-emitting element provided on the predetermined surface of the substrate, wherein the second light-emitting element emits light to the object to be measured, and the predetermined surface faces the object to be measured; a light-receiving element provided on the predetermined surface of the substrate, the light-receiving element receiving reflected light from the object to be measured, and the light-receiving element outputting an output value on the basis of a light receiving result of the light-receiving element; a first amplifier circuit configured to amplify the output value output from the light-receiving element; and a second amplifier circuit configured to amplify the output value amplified by the first amplifier circuit.

Further features of the present disclosure will become apparent from the following description of exemplary embodiments (with reference to the attached drawings).

DESCRIPTION OF THE EMBODIMENTS

Figure 1:
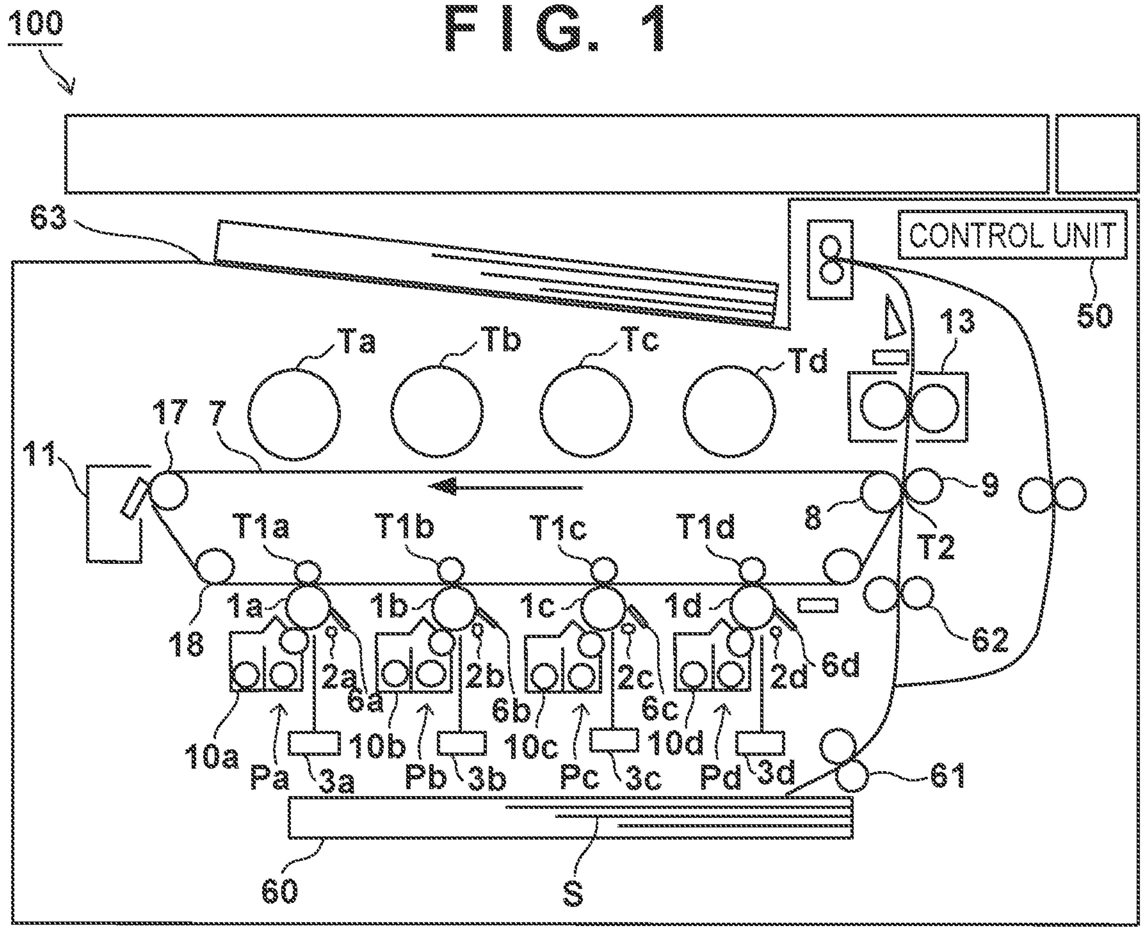
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Image Forming Apparatus

As illustrated in FIG. 1, an image forming apparatus 100 is a printer, a copier, a multifunction peripheral, a facsimile machine, or the like that forms color images using the electrophotographic method. Four image forming units Pa to Pd are controlled by a control unit 50, and each forms an image on an intermediate transfer belt 7 using a different color of toner. The lowercase letters a, b, c, and d at the end of the reference signs indicate yellow, magenta, cyan, and black, respectively. The lowercase letters a, b, c, and d may be omitted when describing items common to the four colors.

A holding tray 60 holds a large number of sheets S. A paper feed roller 61 feeds the sheets S one by one from the holding tray 60 into a transport path. A resist roller 62 corrects skew in the sheet S and transports the sheet S to a secondary transfer unit T2.

Each image forming unit P includes a photosensitive member 1, a charger 2, an exposure device 3, a developer 10, a primary transfer unit T1, and a photosensitive member cleaner 6. The charger 2 uniformly charges the surface of the photosensitive member 1. The photosensitive member 1 is rotationally driven by a motor or the like. The exposure device 3 irradiates the surface of the photosensitive member 1 with light and forms an electrostatic latent image thereon.

The developer 10 develops the electrostatic latent image carried on the photosensitive member 1 using toner, and forms a toner image. The primary transfer unit T1 transfers the toner image carried on the photosensitive member 1 to the intermediate transfer belt 7. The yellow, magenta, cyan, and black toner images are transferred onto the intermediate transfer belt 7 in a superimposed manner. A full-color image is formed as a result. The photosensitive member cleaner 6 cleans and collects toner remaining on the photosensitive member 1. When the amount of toner held inside the developers 10*a* to 10*d* drops below a predetermined amount, toner is replenished from toner bottles Ta to Td, which are developing agent replenishment receptacles.

The intermediate transfer belt 7 is an endless belt stretched by an inner roller 8, a tension roller 17, and an upstream roller 18. The intermediate transfer belt 7 is driven by the inner roller 8, the tension roller 17, and the upstream roller 18, and rotates in the direction indicated by the arrow. When the intermediate transfer belt 7 rotates, the toner image is transported to the secondary transfer unit T2.

The secondary transfer unit T2 is a transfer nip unit formed by the inner roller 8 and an outer roller 9 disposed facing each other. The inner roller 8 and outer roller 9 may be called "secondary transfer rollers". The secondary transfer unit T2 transfers the toner image from the intermediate transfer belt 7 to the sheet S. A belt cleaner 11 cleans and collects toner remaining on the intermediate transfer belt 7.

A fixer 13 applies pressure and heat to the toner image and sheet S to melt and fix the toner image onto the sheet S. The fixer 13 discharges the sheet S onto a paper discharge tray 63.

An optical sensor 70 is provided near the intermediate transfer belt 7, and detects a toner pattern for color shift detection and a toner pattern for density detection. In FIG. 1, the optical sensor 70 is disposed between the photosensitive member 1*d* and the outer roller 9. This position is a position where the yellow, magenta, cyan, and black toner images can be detected.

Image Forming Apparatus

Figure 2:
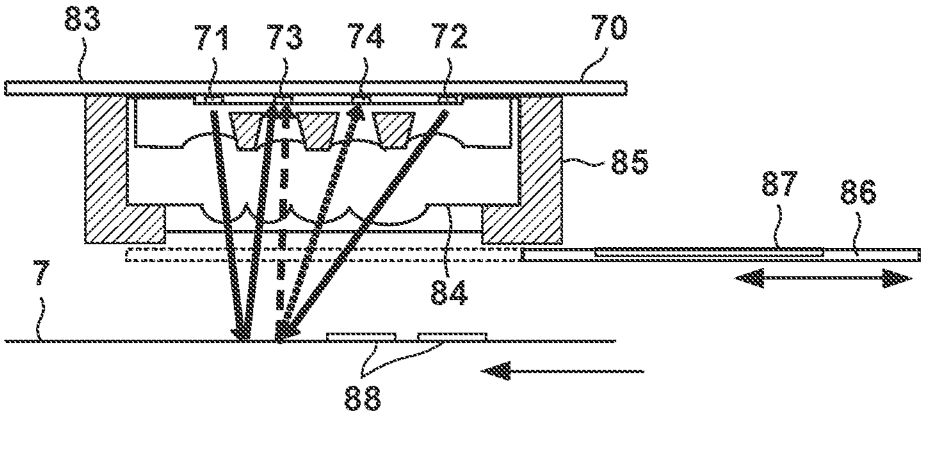
FIG. 2 is a diagram illustrating an optical sensor.

FIG. 2 illustrates the optical sensor 70. The optical sensor 70 detects a toner pattern 88 formed on the intermediate transfer belt 7 and a base material of the intermediate transfer belt 7. The optical sensor 70 has two light-emitting elements and two light-receiving elements. The LEDs 71 and 72 are, for example, light-emitting diodes that emit infrared light. The PDs 73 and 74 are, for example, photodetectors or photodiodes that receive infrared light. An integrated molded lens 84 is configured so that the light from the LED 71 forms a suitable spot on the intermediate transfer belt 7. The molded lens 84 is configured so that the light from the LED 72 forms a suitable spot on the intermediate transfer belt 7. Furthermore, the molded lens 84 is configured so that reflected light from the base material of the intermediate transfer belt 7 or the toner pattern 88 forms an image on the PD 73. The molded lens 84 is configured so that reflected light from the toner pattern 88 forms an image on the PD 74.

LEDs 71 and 72 and PDs 73 and 74 are mounted on an electrical board (substrate) 83 along with a drive circuit. A housing 85 is a housing that houses these components.

The LED 71 is positioned so that the infrared light from the LED 71 is incident on the intermediate transfer belt 7 at an incident angle of 10°. The PD 73 is positioned so that regularly-reflected light which, of the light with which the intermediate transfer belt 7 and the toner pattern 88 have been irradiated, has a reflection angle of −10°, is incident on the PD 73. The LED 72 is positioned so that the infrared light from the LED 72 is incident on the intermediate transfer belt 7 at an incident angle of −35°. The PD 73 is positioned so as to be capable of receiving regularly-reflected light which, of the light with which the LED 72 has irradiated the intermediate transfer belt 7 and the toner pattern 88, has a reflection angle of −7°. Therefore, the PD 73 receives the regularly-reflected light, of the light emitted from the LED 71, reflected by the intermediate transfer belt 7 and toner pattern 88, and the diffuse light, of the light emitted by the LED 72, reflected by the intermediate transfer belt 7 and toner pattern 88. The control unit 50 turns on the LED 71 and turns off the LED 72 to cause the PD 73 to detect the regularly-reflected light. The control unit 50 turns off the LED 71 and turns on the LED 72 to cause the PD 73 to detect the diffuse light. The PD 74 receives the diffuse light, output from the LED 72, which of the light reflected by the intermediate transfer belt 7 and toner pattern 88 has a reflection angle of −18°.

The optical sensor 70 includes a shutter member 86 capable of opening and closing. When the optical sensor 70 is to detect the base material of the intermediate transfer belt 7 or the toner pattern 88, the shutter member 86 moves from a closed position to an open position. When the optical sensor 70 is not detecting the base material of the intermediate transfer belt 7 or the toner pattern 88, the shutter member 86 stays in the closed position. This makes it less likely that the optical sensor 70 will be soiled, and makes it easier to maintain the amount of light received by the optical sensor 70. A diffuse light reference plate 87 is provided on a rear surface of the shutter member 86. The optical sensor 70 can detect reflected light from the diffuse light reference plate 87 while the shutter member 86 is closed.

Control Unit

Figure 3:
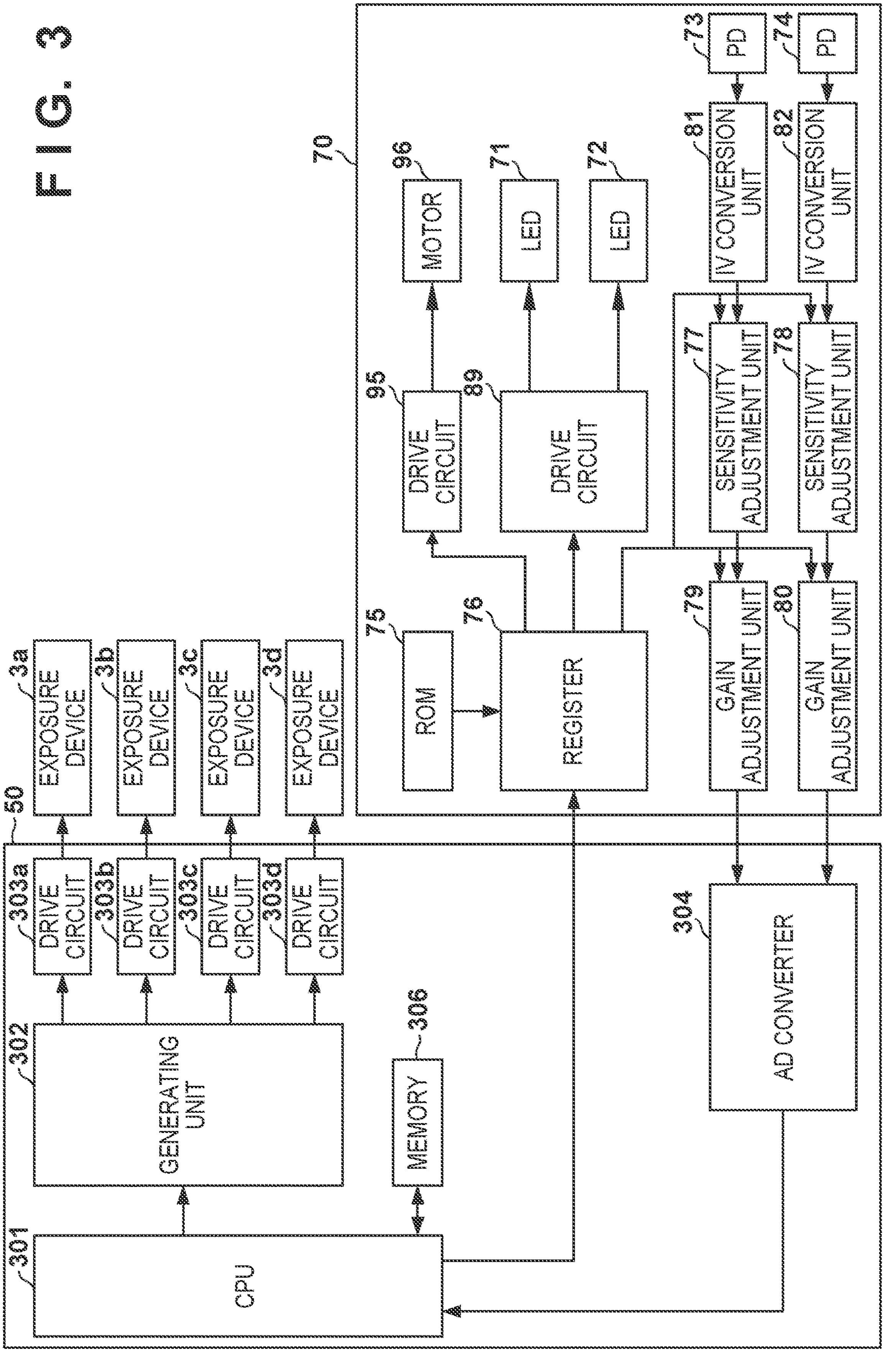
FIG. 3 is a diagram illustrating a control unit.

FIG. 3 illustrates the control unit 50 and the optical sensor 70. A CPU 301 drives the motor and the like on the basis of signals input from sensors, and causes the image forming apparatus 100 to execute an electrophotographic process. Memory 306 is connected to the CPU 301. A control program is stored in a ROM area of the memory 306. Temporary data is stored in a RAM area of memory 306.

A generating unit 302 converts image data from a user into an image signal and outputs the image signal to a drive circuit 303. The drive circuit 303 drives the exposure device 3 according to the image signal. The generating unit 302 also generates an image signal for forming a test pattern.

The optical sensor 70 includes ROM 75 provided on the electrical board 83. The ROM 75 stores various types of property data determined when the optical sensor 70 is shipped from the factory, in accordance with individual differences of the optical sensor 70. A "sensitivity adjustment value" is a parameter for correcting individual differences among light-receiving elements. A "leaked light value" is a parameter for subtracting light, of the light from the LEDs 71 and 72, which is directly incident on the PDs 73 and 74, from the received light amount. As illustrated in FIG. 2, a light-blocking partition is provided between the LED 71 and the PD 73. A light-blocking partition is also provided between the PD 73 and the PD 74. A light-blocking partition is also provided between the PD 74 and the LED 72. These light-blocking partitions block most direct light, but some may leak through. The leaked light value is therefore measured before shipping from the factory. The housing 85 deforms as the temperature of the optical sensor 70 rises. At this time, the positional relationship between the LEDs 71 and 72 and the PDs 73 and 74 may change. Accordingly, a correction amount for the received light amount relative to the temperature is measured when shipping from the factory, and is held in the ROM 75 as correction data.

When the optical sensor 70 is started up, some information stored in the ROM 75 is written into a register 76. The CPU 301 also writes information into the register 76. A drive circuit 89 controls the turning on and off of LEDs 71 and 72, as well as a drive current (light emission amount), according to values set in the register 76.

The PD 73 photoelectrically converts the received light and outputs a detection current corresponding to the received light amount to an IV conversion unit 81. The IV conversion unit 81 converts the detection current into a detection voltage and outputs the detection voltage to a sensitivity adjustment unit 77. The sensitivity adjustment unit 77 adjusts the sensitivity of the PD 73 by adjusting an amplification rate of the detection voltage according to a value set in the register 76. A gain adjustment unit 79 adjusts an amplification rate (gain) of the detection voltage output from the sensitivity adjustment unit 77.

The PD 74 photoelectrically converts the received light and outputs a detection current corresponding to the received light amount to an IV conversion unit 82. The IV conversion unit 82 converts the detection current into a detection voltage and outputs the detection voltage to a sensitivity adjustment unit 78. The sensitivity adjustment unit 78 adjusts the sensitivity of the PD 74 by adjusting an amplification rate of the detection voltage according to a value set in the register 76. A gain adjustment unit 80 adjusts an amplification rate (gain) of the detection voltage output from the sensitivity adjustment unit 78. An AD converter 304 converts an analog detection signal (detection voltage) output from the optical sensor into a digital value and outputs the digital value to the CPU 301.

A motor 96 opens and closes the shutter member 86. The CPU 301 controls the motor 96 through a drive circuit 95 by writing instructions into the register 76.

Sensitivity Adjustment Unit and Gain Adjustment Unit

Figure 4:
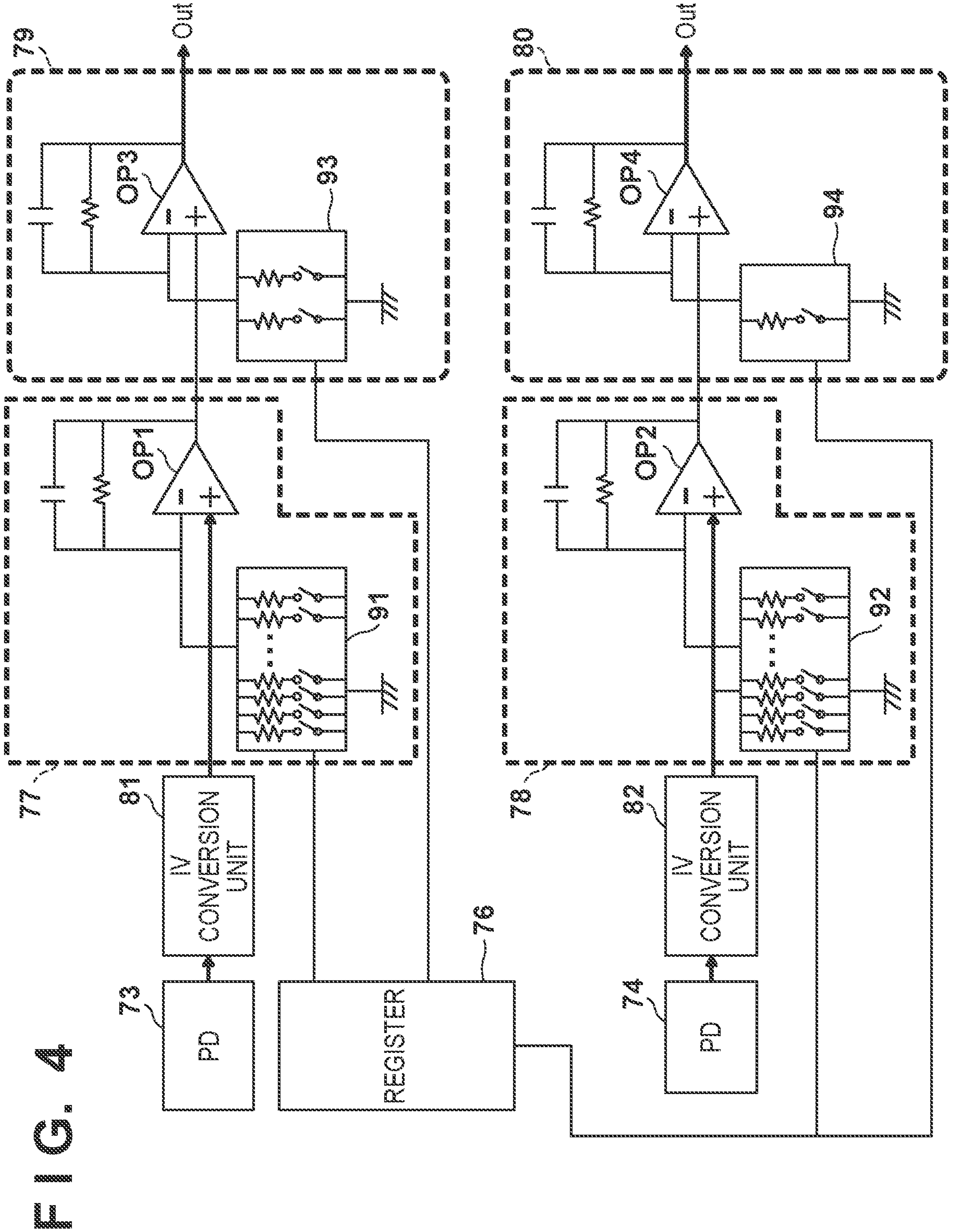
FIG. 4 is a diagram illustrating a sensitivity adjustment unit and a gain adjustment unit.

FIG. 4 illustrates the sensitivity adjustment units 77 and 78 and the gain adjustment units 79 and 80. The sensitivity adjustment unit 77 includes an electronic volume 91, the resistance value of which can be changed according to an adjustment value set in the register 76, and an amplifier circuit OP1. The electronic volume 91 includes a switch (e.g., a transistor or a FET) that turns on and off according to the adjustment value, and a resistor connected to the switch. As illustrated in FIG. 4, a plurality of pairs constituted by switches and resistors are connected in parallel. The resistance value of the electronic volume 91 changes in response to the switch being turned on and off according to the adjustment value. The amplification rate of the amplifier circuit OP1 changes according to the resistance value of the electronic volume 91. In other words, the amplification rate of the sensitivity adjustment unit 77 changes. The amplification rate may also be referred to as "gain".

The adjustment value (setting value) of the register 76 can be changed by the CPU 301. The CPU 301 can continuously change the amplification rate of the sensitivity adjustment unit 77. The amplification rate of the sensitivity adjustment unit 77 can be set from 1× to 200×, at a resolution in units of 1×, in accordance with the setting value.

The sensitivity adjustment unit 78 includes an electronic volume 92, the resistance value of which can be changed according to an adjustment value set in the register 76, and an amplifier circuit OP2. The electronic volume 92 includes a switch (e.g., a transistor or a FET) that turns on and off according to the adjustment value, and a resistor connected to the switch. The resistance value of the electronic volume 92 changes in response to the switch being turned on and off according to the adjustment value. The amplification rate of the amplifier circuit OP2 changes according to the resistance value of the electronic volume 92. In other words, the amplification rate of the sensitivity adjustment unit 78 changes.

The adjustment value (setting value) of the register 76 can be changed by the CPU 301. The CPU 301 can continuously change the amplification rate of the sensitivity adjustment unit 78. The amplification rate of the sensitivity adjustment unit 78 can be set from 1× to 200×, at a resolution in units of 1×, in accordance with the setting value.

The gain adjustment unit 79 includes a gain switching circuit 93, the resistance value of which can be changed according to an adjustment value set in the register 76, and an amplifier circuit OP3. The gain switching circuit 93 includes a switch (e.g., a transistor or a FET) that turns on and off according to the adjustment value, and a resistor connected to the switch. The resistance value of the gain switching circuit 93 changes in response to the switch being turned on and off according to the adjustment value. The amplification rate of the amplifier circuit OP3 changes according to the resistance value of the gain switching circuit 93. In other words, the amplification rate of the gain adjustment unit 79 changes.

The adjustment values (setting values) in the register 76 may be changed or set by the CPU 301. The CPU 301 can change the amplification rate of the gain adjustment unit 79. The amplification rate of the gain adjustment unit 79 can be set to one of 10×, 20×, and 200×, according to the setting value.

The gain adjustment unit 80 includes a gain switching circuit 94, the resistance value of which can be changed according to an adjustment value set in the register 76, and an amplifier circuit OP4. The gain switching circuit 94 includes a switch (e.g., a transistor or a FET) that turns on and off according to the adjustment value, and a resistor connected to the switch. The resistance value of the gain switching circuit 94 changes in response to the switch being turned on and off according to the adjustment value. The amplification rate of the amplifier circuit OP4 changes according to the resistance value of the gain switching circuit 94. In other words, the amplification rate of the gain adjustment unit 80 changes.

The adjustment value (setting value) of the register 76 can be changed by the CPU 301. The CPU 301 can change the amplification rate of the gain adjustment unit 80. The amplification rate of the gain adjustment unit 80 can be set to one of 10× and 20× according to the setting value.

In this manner, the detection signal output by the PD 73 is amplified by two amplifier circuits, namely the sensitivity adjustment unit 77 and the gain adjustment unit 79. Likewise, the detection signal output by the PD 74 is amplified by two amplifier circuits, namely the sensitivity adjustment unit 78 and the gain adjustment unit 80. The sensitivity adjustment units 77 and 78 are used to adjust the individual differences between the PDs 73 and 74, which are determined when the optical sensor 70 is shipped from the factory. The gain adjustment units 79 and 80 are used to adjust the detection signal in response to changes in the environment of the optical sensor 70.

Optical Sensor Sensitivity Adjustment

Figure 5A:
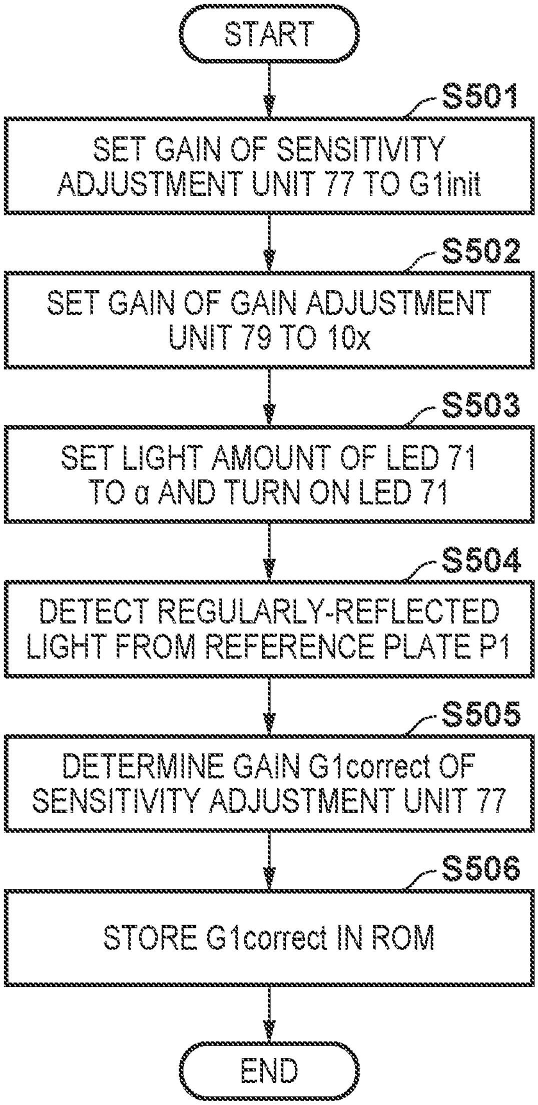
FIGS. 5A and 5B are flowcharts illustrating sensitivity adjustment performed at a factory.
Figure 5B:
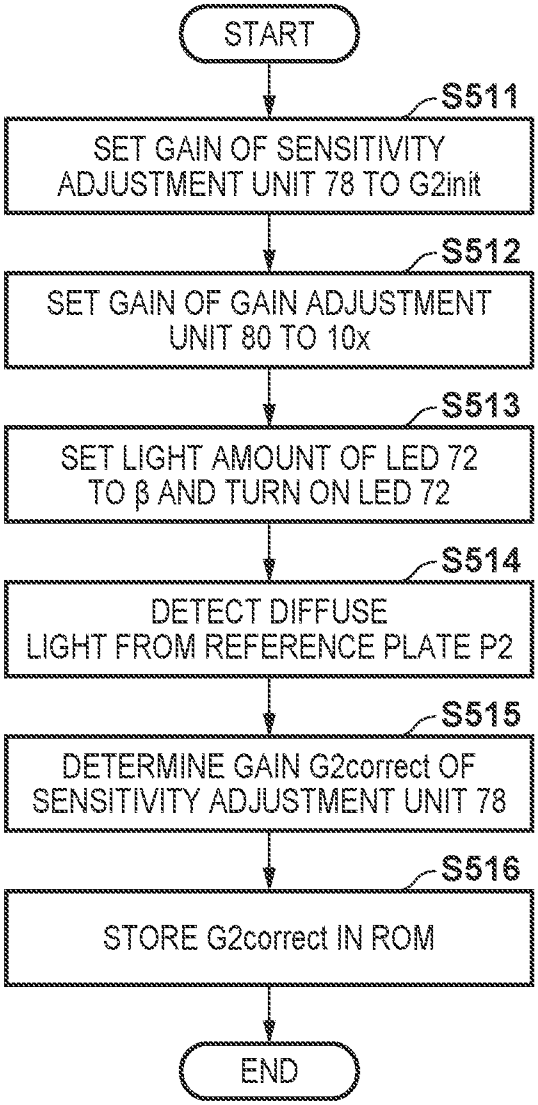

FIGS. 5A and 5B illustrate sensitivity adjustment processing for the PDs 73 and 74 performed at the factory of the optical sensor 70. Individual differences arise among light-emitting elements and light-receiving elements due to the manufacturing process. As such, identical detection results may not be obtained even when toner images of the same density are detected. The sensitivity adjustment processing is therefore necessary as processing for correcting individual differences among optical sensors 70.

The sensitivity adjustment processing is performed using an adjustment tool before installing the optical sensor 70 in the image forming apparatus 100. Therefore, reference plates for sensitivity adjustment, which are not included in the image forming apparatus 100, are disposed at a detection position of the optical sensor 70. A reference plate P1 for detecting regularly-reflected light and a reference plate P2 for detecting diffuse light are used as the reference plates. The adjustment tool is an apparatus including the CPU 301, the memory 306, and the AD converter 304 of the control unit 50. The following will therefore describe the sensitivity adjustment processing under the assumption that the adjustment tool is the control unit 50. Alternatively, the CPU 301, the memory 306, and the AD converter 304 described in the sensitivity adjustment processing may be understood as being the hardware of the adjustment tool.

Adjustment of Sensitivity Adjustment Unit 77

In step S501, the CPU 301 sets the sensitivity (the amplification rate) of the sensitivity adjustment unit 77 to G1init. G1init is an initial value determined according to the design. This setting is performed by writing G1init, which is the amplification rate of the electronic volume 91, into the register 76. As a result, the resistance value of the electronic volume 91 switches so that the amplification rate of the sensitivity adjustment unit 77 becomes G1init. Note that the amplification rate is the amplification rate of the level (voltage value) of the detection signal output by the IV conversion unit 81.

In step S502, the CPU 301 sets the amplification rate of the gain adjustment unit 79 to 10×. 10× is merely an example. It is assumed here that regularly-reflected light is to be detected, and thus the minimum amplification rate among the settable amplification rates can be selected. By writing "10×" into the register 76, the CPU 301 sets the amplification rate of the gain adjustment unit 79 to 10×.

In step S503, the CPU 301 turns on the LED 71 so that the light emission amount of the LED 71 is a predetermined light amount α. By writing the predetermined light amount α into the register 76, the CPU 301 sets the light emission amount of the LED 71 to the predetermined light amount α.

In step S504, the CPU 301 causes the PD 73 to detect regularly-reflected light from the reference plate P1. The CPU 301 stores a detection result (a detection value a) output from the AD converter 304 at this time in a RAM area of the memory 306.

In step S505, the CPU 301 determines a sensitivity setting value G1correct of the sensitivity adjustment unit 77. The sensitivity setting value G1correct is determined through the following equation, for example.

$$G1\ \text{correct}=(p1tgt \mp a) \mp G1\text{init} \tag{1}$$

Here, p1tgt represents a target value of the detection result for regularly-reflected light.

In step S506, the CPU 301 stores the sensitivity setting value G1correct in the ROM 75.

Adjustment of Sensitivity Adjustment Unit 78

In step S511, the CPU 301 sets the sensitivity (the amplification rate) of the sensitivity adjustment unit 78 to G2init. G2init is an initial value determined according to the design. This setting is performed by writing G2init, which is the amplification rate of the electronic volume 92, into the register 76. As a result, the resistance value of the electronic volume 92 switches so that the amplification rate of the sensitivity adjustment unit 78 becomes G2init. Note that the amplification rate is the amplification rate of the level (voltage value) of the detection signal output by the IV conversion unit 82.

In step S512, the CPU 301 sets the amplification rate of the gain adjustment unit 80 to 10×. 10× is merely an example. Here, regularly-reflected light is used as a reference, and thus the minimum amplification rate among the settable amplification rates is selected. By writing "10×" into the register 76, the CPU 301 sets the amplification rate of the gain adjustment unit 80 to 10×.

In step S513, the CPU 301 turns on the LED 72 so that the light emission amount of the LED 72 is a predetermined light amount β. By writing the predetermined light amount β into the register 76, the CPU 301 sets the light emission amount of the LED 72 to the predetermined light amount β.

In step S514, the CPU 301 causes the PD 74 to detect diffuse light from the reference plate P2. The CPU 301 stores a detection result (a detection value b) output from the AD converter 304 at this time in the RAM area of the memory 306.

In step S515, the CPU 301 determines a sensitivity setting value G2correct of the sensitivity adjustment unit 78. The sensitivity setting value G2correct is determined through the following equation, for example.

$$G2\text{correct}=(p2tgt \mp b) \mp G2\text{init} \tag{2}$$

Here, p2tgt represents a target value of the detection result for diffuse light.

In step S516, the CPU 301 stores the sensitivity setting value G2correct in the ROM 75.

In this manner, the sensitivity of the PD 73 is adjusted using the reference plate P1 for regularly-reflected light. The sensitivity of the PD 74 is adjusted using the reference plate P2 for diffuse light. The PD 73 can detect both regularly-reflected light and diffuse light by selectively turning on the LED 71 and the LED 72. However, the sensitivity adjustment of the PD 73 is performed using the detection result of the regularly-reflected light. The reason for this is that if the sensitivity is adjusted on the basis of diffuse light, the gain of the electronic volume 91 will become too high and the detection result for regularly-reflected light will saturate. It is necessary to suppress such saturation of the detection result in order to detect the toner pattern accurately. In the present embodiment, two amplifier circuits are used, namely the sensitivity adjustment units 77 and 78 and the gain adjustment units 79 and 80. Accordingly, switching the amplification rate for regularly-reflected light and the amplification rate for diffuse light using the gain adjustment units 79 and 80 makes it possible to accurately detect both regularly-reflected light and diffuse light.

As illustrated in FIG. 4, the amplifier circuits are divided into the electronic volumes 91 and 92 in the first stage and the gain switching circuits 93 and 94 in the second stage. The electronic volumes 91 and 92 are provided to correct for individual differences and to ensure that multiple optical sensors 70 all have essentially the same sensitivity characteristics. The gain switching circuits 93 and 94 are provided to reduce the surface reflectance of the intermediate transfer belt 7 and to prevent a window surface of the optical sensor 70 from being soiled by scattered toner. There are situations where the S/N ratio of the detection result from the optical sensor 70 does not reach a target value even when the light emission amount of the light-emitting element is set to the maximum settable value. Thus using the gain switching circuits 93 and 94 to correct the sensitivity (amplification rate) makes it possible to extend the life of the optical sensor 70 and the intermediate transfer belt 7.

Color Shift Detection

Figure 6A:
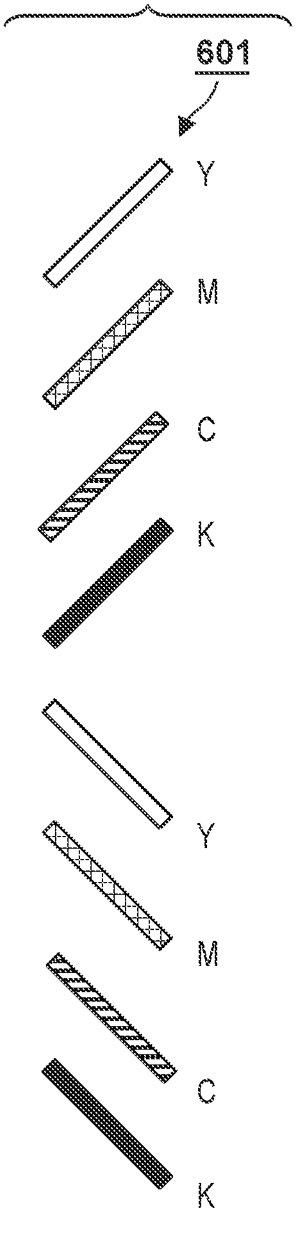
FIGS. 6A to 6C are diagrams illustrating test patterns.

FIG. 6A illustrates a first pattern 601 for color shift detection. "Color shift" refers to an amount of shift in an image formation position of a given color relative to the image formation position of a reference color. The reference color is yellow, for example. The first pattern 601 includes a yellow (Y) pattern, a magenta (M) pattern, a cyan (C) pattern, and a black (K) pattern. The first pattern 601 is a test pattern that is detected by turning on the LED 71, turning off the LED 72, and receiving the regularly-reflected light with the PD 73. The first pattern 601 is used when a detection level of regularly-reflected light from the base material of the intermediate transfer belt 7 is above a threshold th1.

Figure 7A:
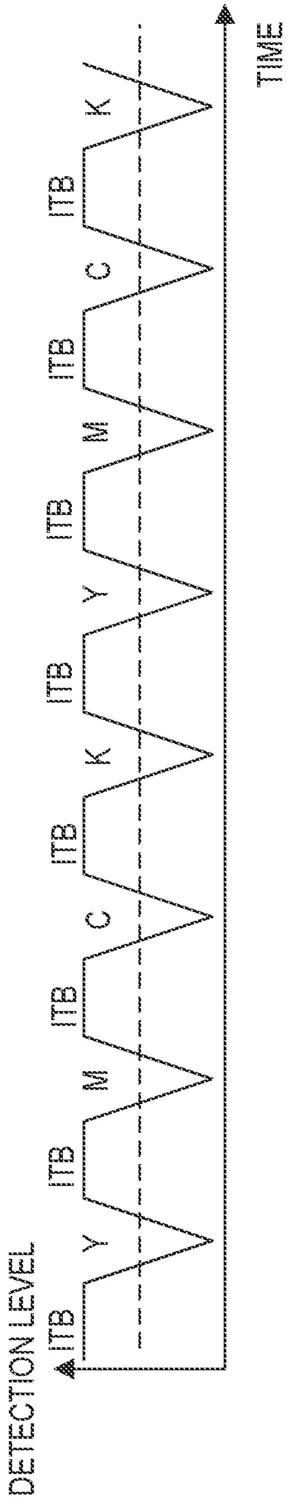
FIGS. 7A to 7C are diagrams illustrating test pattern detection results.

FIG. 7A illustrates a detection result for the first pattern 601. The broken line represents a light amount at which edge detection is executed. In FIG. 7A, "ITB" refers to the base material of the intermediate transfer belt 7. When the reflectance of the surface of the intermediate transfer belt 7 is sufficiently high, there will be more regularly-reflected light from the intermediate transfer belt 7. Therefore, there is a significant difference between the detection level of the base material of the intermediate transfer belt 7 and the detection level of each of the YMCK patterns. This makes it possible to detect the position of the rising edge of each YMCK pattern, and find the amount of color shift. Because two edges are detected for each pattern, a location between the two edges is found as the center of the pattern (image formation position).

Figure 6B:
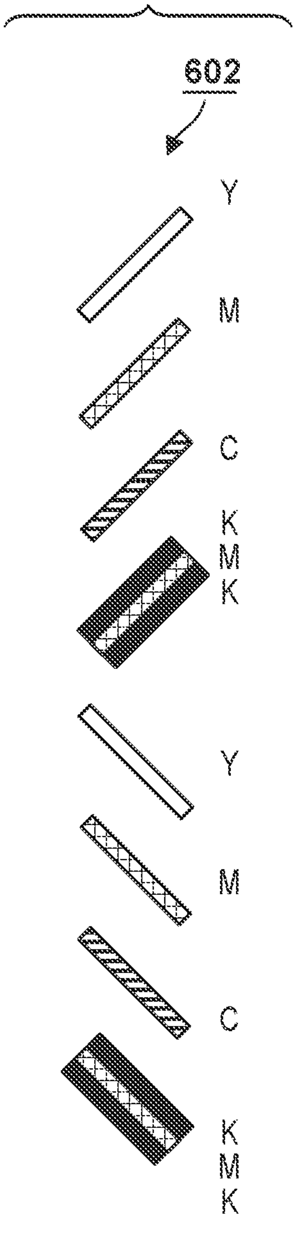

FIG. 6B illustrates a second pattern 602 for color shift detection. The second pattern 602 is a test pattern that is detected by turning off the LED 71, turning on the LED 72, and receiving the diffuse light with the PD 73. The second pattern 602 is used when the detection level of reflected light from the intermediate transfer belt 7 is less than the threshold th1.

Figure 7B:
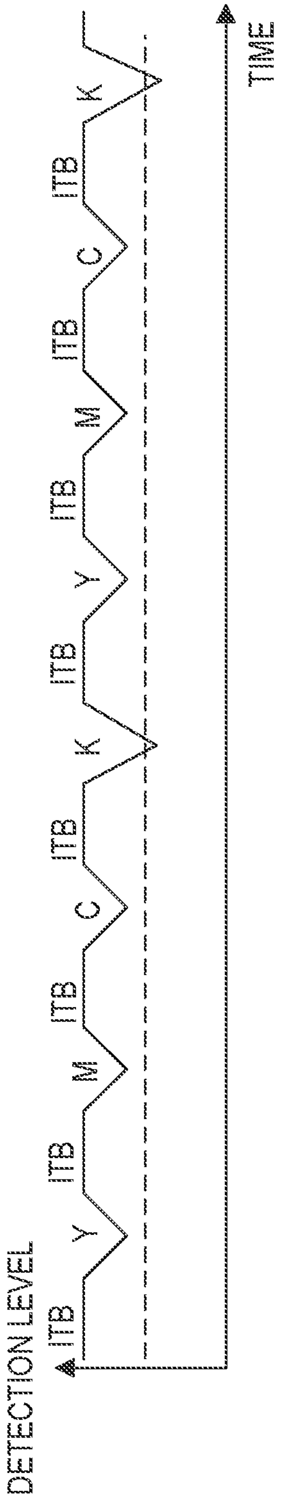

When the intermediate transfer belt 7 is used for many years, the reflectance of the surface of the intermediate transfer belt 7 drops from an initial value (the reflectivity when new). The amount of regularly-reflected light from the intermediate transfer belt 7 drops as a result. FIG. 7B illustrates a detection result of the first pattern 601 when the amount of regularly-reflected light from the intermediate transfer belt 7 has dropped. As illustrated in FIG. 7B, a difference between the detection level of the base material of the intermediate transfer belt 7 and the detection level of the yellow (Y), magenta (M), cyan (C), and black (K) patterns decreases. In this case, it is difficult to detect the edges of yellow (Y), magenta (M), cyan (C), and black (K) patterns.

Figure 6C:
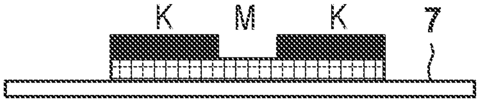
Figure 7C:
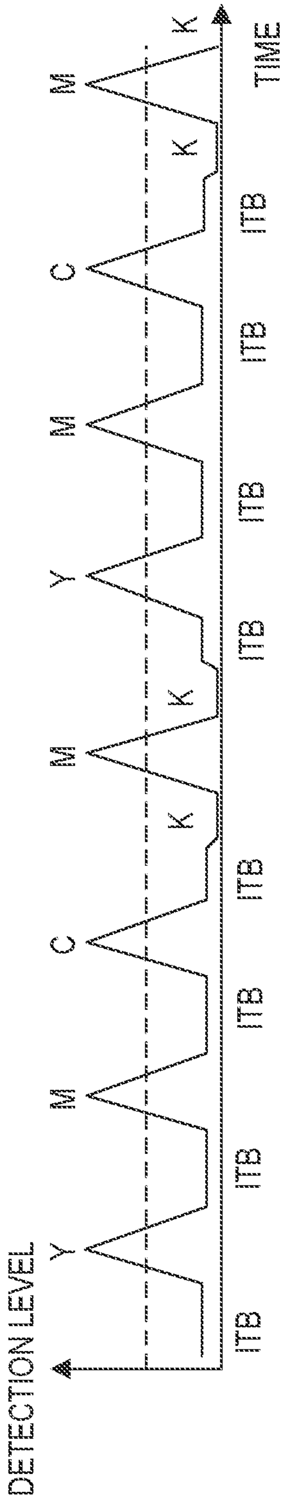

The diffuse light is therefore detected. In the diffuse light detection, the LED 71 is turned off and the LED 72 is turned on. Furthermore, the PD 73 receives the diffuse light. The second pattern 602 is used. FIG. 7C illustrates a detection result for the second pattern 602. The chromatic color patterns all cross the broken line for edge detection, and thus edge detection is possible. Note that in the diffuse light detection, the difference between the detection level of the base material of the intermediate transfer belt 7 and the detection level of the black test pattern is too low. Thus as illustrated in FIGS. 6B and 6C, the black pattern is formed on both sides of the magenta test pattern. As illustrated in FIG. 7C, there is a significant difference between the magenta detection level and the black detection level. As such, detecting the edges for magenta effectively makes it possible to detect the edges of black as well.

The second pattern 602 uses a greater amount of magenta and black toner than the first pattern 601. In other words, prioritizing the use of the first pattern 601 reduces the amount of magenta and black toner that is consumed.

In this manner, the CPU 301 detects the amount of color shift of other colors relative to the reference color using the first pattern 601 or the second pattern 602. The CPU 301 also adjusts the writing timing of the images of other colors relative to the reference color in accordance with the amount of color shift. This reduces color shifts.

Density Detection

Figure 8A:
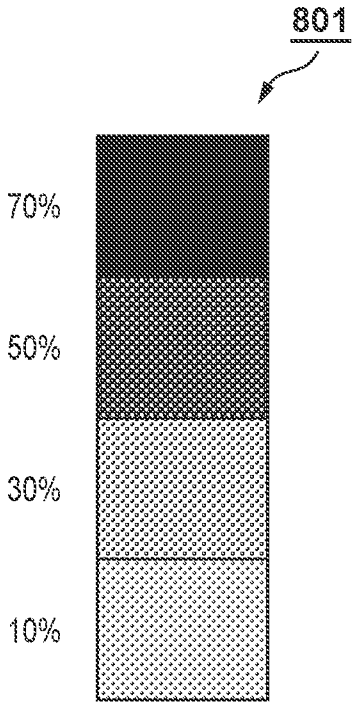
FIGS. 8A and 8B are diagrams illustrating test patterns.

FIG. 8A illustrates a first density pattern 801 for detecting the density of a toner image. The first density pattern 801 is a test pattern for turning on the LED 71, turning off the LED 72, and receiving the regularly-reflected light with the PD 73. The first density pattern 801 is a test pattern for black. Black has the property of absorbing light. It is therefore difficult to detect the black pattern with diffuse light. As such, the first density pattern 801 for black is detected using regularly-reflected light. The first density pattern 801 includes four tone patterns (e.g., 70%, 50%, 30%, and 10%). The CPU 301 detects the first density pattern 801 formed on the intermediate transfer belt 7 with the optical sensor 70 and calculates a difference between the detection result and a tone target. The CPU 301 corrects image formation conditions (e.g., transfer voltage, a tone correction table) so that each density (tone) approaches the tone target.

Figure 9A:
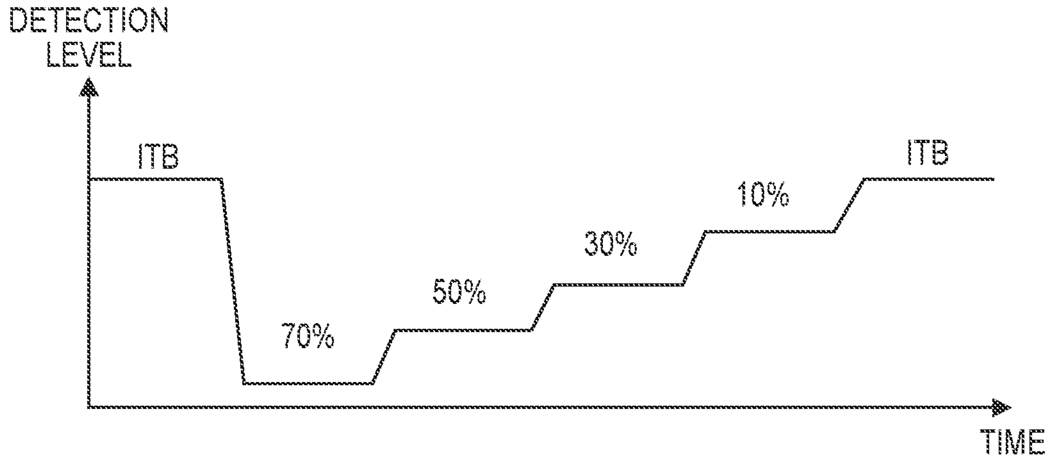
FIGS. 9A and 9B are diagrams illustrating test pattern detection results.

FIG. 9A illustrates a detection result for the first density pattern 801. A high-density (e.g., 70%) density pattern absorbs a large amount of light, and the detection level is therefore low. On the other hand, a low-density (e.g., 10%) density pattern absorbs less light, and the detection level is therefore high.

Figure 8B:
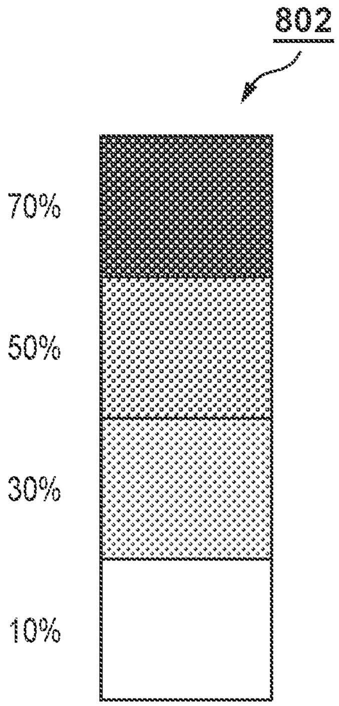

FIG. 8B illustrates a second density pattern 802 for detecting the density. The second density pattern 802 is a test pattern for turning off the LED 71, turning on the LED 72, and receiving the diffuse light with the PD 74. The second density pattern 802 is used to detect the density of chromatic colors such as yellow (Y), magenta (M), and cyan (C). Note that FIG. 8B illustrates the test pattern for one color.

The reflectance of yellow (Y), magenta (M), and cyan (C) is higher than the reflectance of the base material of the intermediate transfer belt 7. The density is therefore detected using the diffuse light.

The second density pattern 802 includes a test pattern of four tones (e.g., 70%, 50%, 30%, and 10%). The CPU 301 detects the second density pattern 802 formed on the intermediate transfer belt 7 with the optical sensor 70 and calculates a difference between the detection result and a tone target. The CPU 301 corrects image formation conditions (e.g., transfer voltage, a tone correction table) so that each density (tone) approaches the tone target.

Figure 9B:
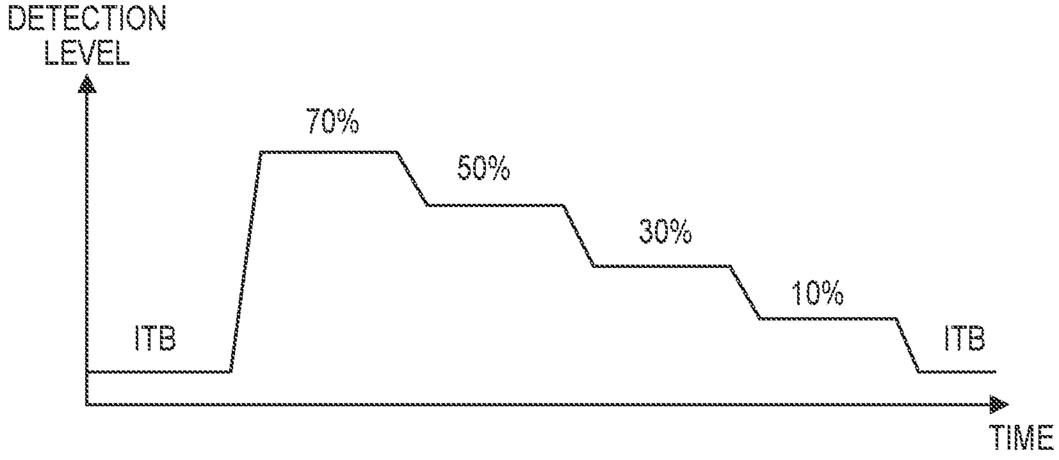

FIG. 9B illustrates a detection result for yellow (Y) detected by the second density pattern 802. A high-density (e.g., 70%) density pattern diffusely reflects a large amount of light, and the detection level of diffuse light is therefore high. A low-density (e.g., 10%) density pattern has a lower amount of diffusely-reflected light (diffuse light), and the detection level is therefore low. The same density detection is executed for magenta (M) and cyan (C).

Color Shift Detection Flowchart

Figure 10:
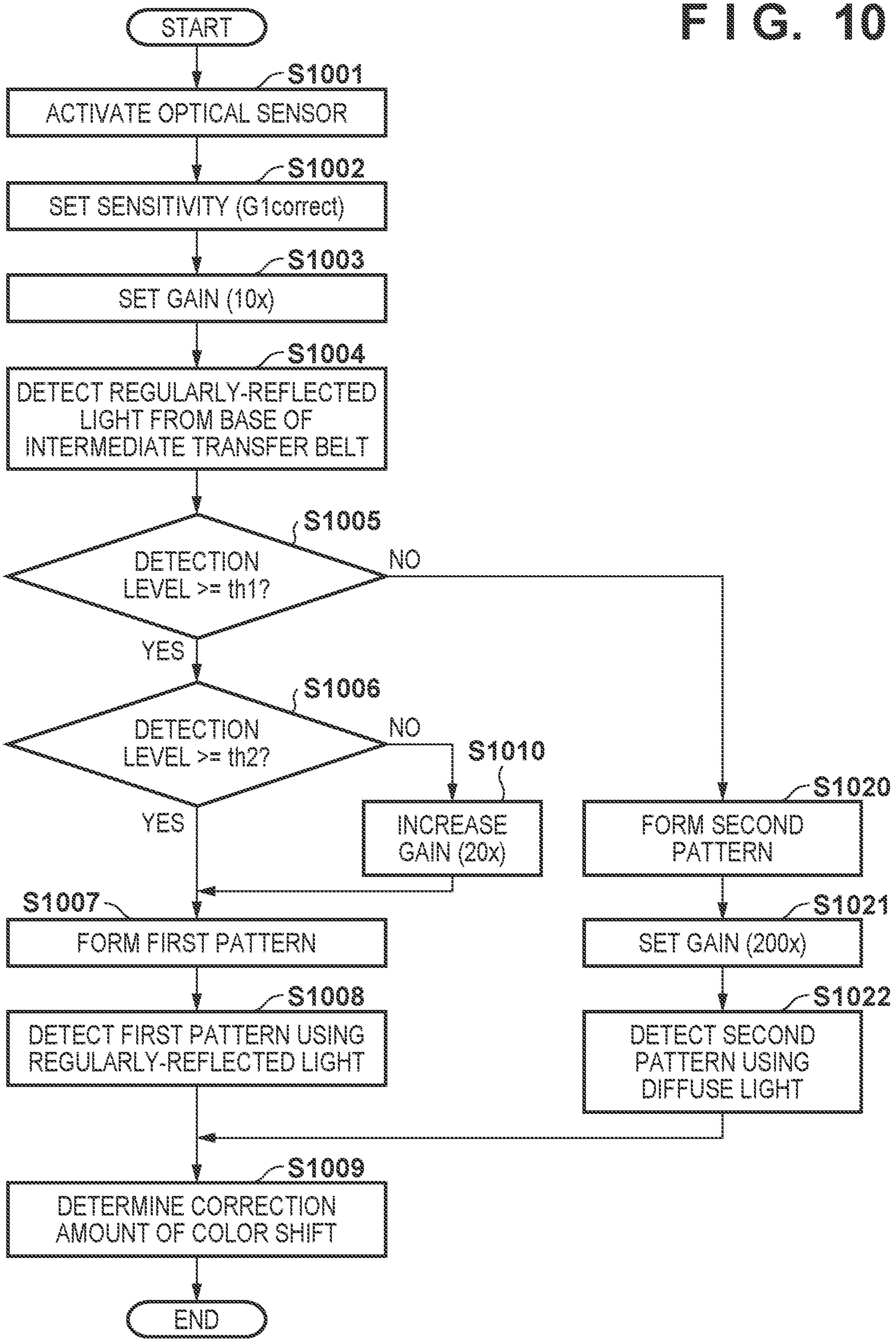
FIG. 10 is a flowchart illustrating color shift detection processing.

FIG. 10 illustrates the color shift detection executed by the CPU 301. The CPU 301 starts the color shift detection when a predetermined starting condition is satisfied. The predetermined starting condition is, for example, that the image forming apparatus 100 has started up, that the number of images formed has reached a predetermined number, that environmental conditions such as temperature and humidity have changed significantly, or the like.

In step S1001, the CPU 301 activates the optical sensor 70. For example, the CPU 301 starts supplying power to the optical sensor 70 from a power supply. The CPU 301 also writes a command into the register 76 to move the shutter member 86 to the open position. The drive circuit 95 drives the motor 96 to move the shutter member 86 to the open position in accordance with the command written into the register 76.

In step S1002, the CPU 301 sets the sensitivity for the PD 73. For example, the CPU 301 reads the sensitivity setting value G1correct stored in the ROM 75 and writes that value into the register 76. The sensitivity setting value G1correct is set in the sensitivity adjustment unit 77 through the register 76.

In step S1003, the CPU 301 sets the gain of the gain adjustment unit 79 (10×). For example, the CPU 301 writes 10×, which is the gain (amplification rate) for detecting regularly-reflected light, into the register 76. In other words, the gain (10×) is set in the gain adjustment unit 79 through the register 76.

In step S1004, the CPU 301 controls the optical sensor 70 to detect regularly-reflected light from the base material of the intermediate transfer belt 7. For example, the CPU 301 turns on the LED 71, turns off the LED 72, and uses the PD 73 to detect the regularly-reflected light.

In step S1005, the CPU 301 determines whether or not the detection level is greater than or equal to the threshold th1. In other words, on the basis of the detection level, the CPU 301 determines whether or not the reflectance of the surface of the intermediate transfer belt 7 is sufficiently high. When the detection level is greater than or equal to the threshold th1, the CPU 301 moves the sequence to step S1006.

In step S1006, the CPU 301 determines whether or not the detection level is greater than or equal to a threshold th2 (where th2>th1). In other words, on the basis of the detection level, the CPU 301 determines whether or not it is necessary to increase the gain of the gain adjustment unit 79. When the detection level is greater than or equal to the threshold th2, the CPU 301 moves the sequence to step S1007. On the other hand, when the detection level is greater than or equal to the threshold th1 but is not greater than or equal to the threshold th2, the CPU 301 moves the sequence to step S1010. In step S1010, the CPU 301 increases the gain of the gain adjustment unit 79. In other words, the CPU 301 sets the gain of the gain adjustment unit 79 to 20×.

In step S1007, the CPU 301 controls the image forming apparatus 100 to form the first pattern 601 on the intermediate transfer belt 7. The CPU 301 controls the generating unit 302 to output an image signal corresponding to the first pattern 601 to the drive circuits 303*a* to 303*d*.

In step S1008, the CPU 301 detects the first pattern 601 using regularly-reflected light. The CPU 301 detects the regularly-reflected light from the first pattern 601 using the PD 73.

In step S1009, the CPU 301 determines the correction amount for color shift on the basis of the detection result for the first pattern 601. As described above, the CPU 301 calculates the amount of color shift of the other colors relative to the reference color on the basis of the detection result for the first pattern 601. Furthermore, the CPU 301 determines the correction amount for the writing timings of the other colors on the basis of the amount of color shift so that the color shift is reduced. When yellow is the reference color, the correction amount is determined for magenta, cyan, and black. In this manner, the amount of color shift is converted into the correction amount for the writing timing.

When, in step S1005, the detection level is not greater than or equal to the threshold th1, the CPU 301 moves the sequence to step S1020. In step S1020, the CPU 301 controls the image forming apparatus 100 to form the second pattern 602 on the intermediate transfer belt 7. The CPU 301 controls the generating unit 302 to output an image signal corresponding to the second pattern 602 to the drive circuits 303*a* to 303*d*.

In step S1021, the CPU 301 sets the gain of the gain adjustment unit 79 (200×). The CPU 301 writes 200×, which is the gain (amplification rate) for detecting diffuse light, into the register 76. The gain (200×) is set in the gain adjustment unit 79 through the register 76.

In step S1022, the CPU 301 detects the second pattern 602 using diffuse light. The CPU 301 turns off the LED 71, turns on the LED 72, and uses the PD 73 to detect the diffuse light from the second pattern 602. Then, in step S1009, the CPU 301 determines the correction amount on the basis of the detection result for the diffuse light. In this manner, selecting the test pattern and detection method according to the degree of wear of the intermediate transfer belt 7 makes it possible to detect color shift more accurately than before. Note that the CPU 301 also writes a command into the register 76 to move the shutter member 86 to the closed position. The drive circuit 95 drives the motor 96 to move the shutter member 86 to the closed position in accordance with the command written into the register 76.

Density Detection Flowchart

Figure 11A:
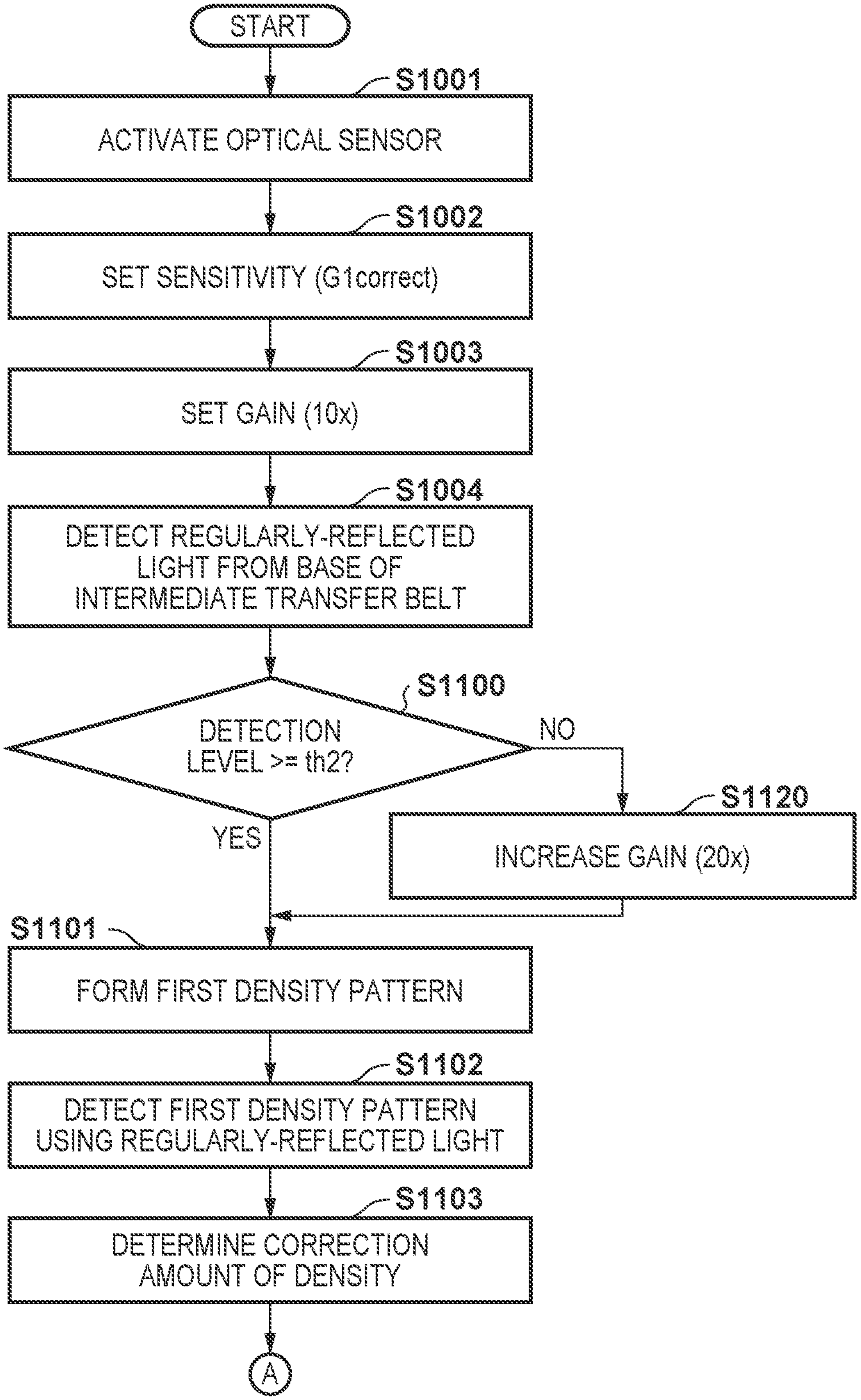
FIGS. 11A and 11B are a flowchart illustrating density detection processing.
Figure 11B:
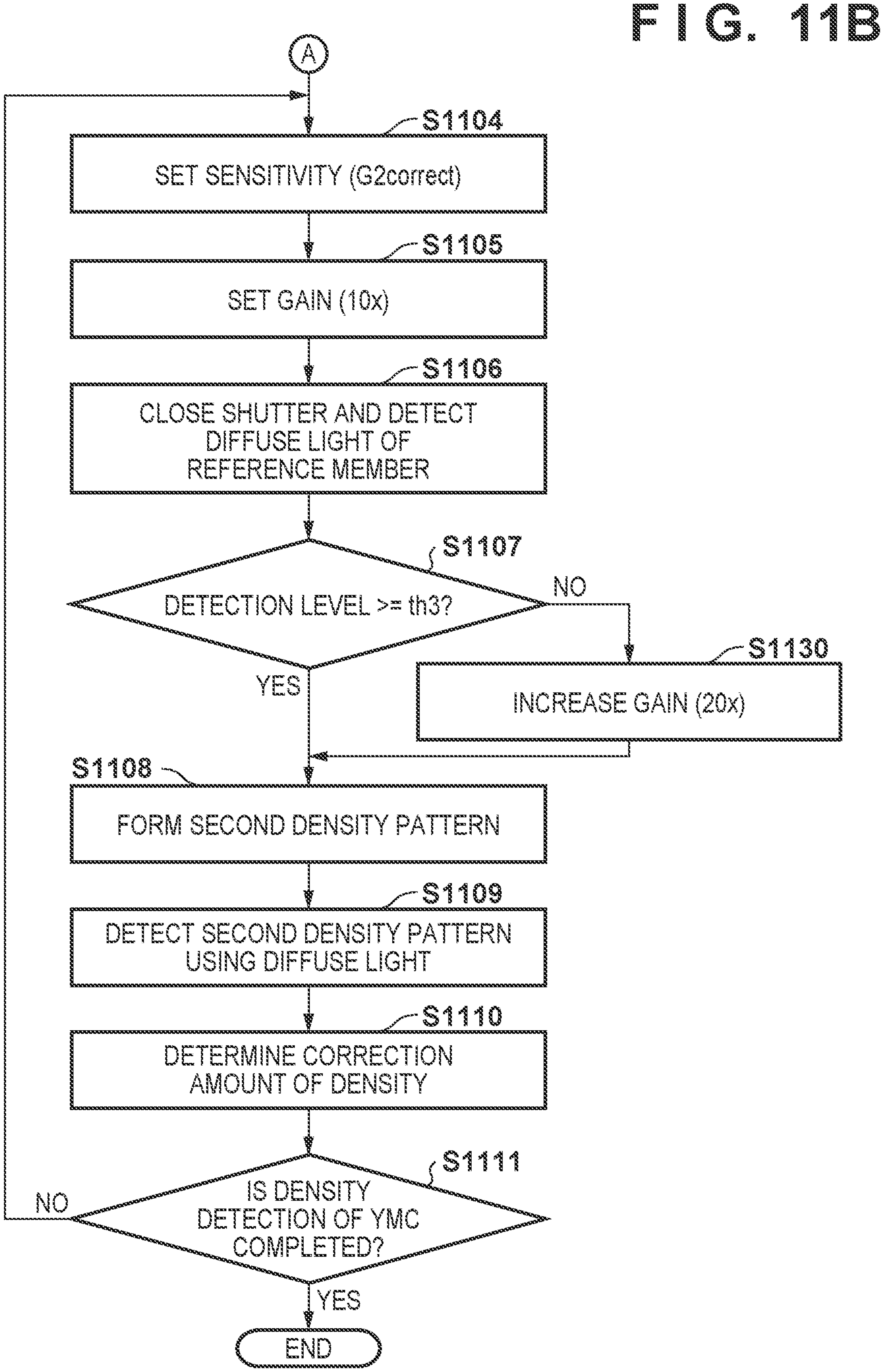

FIGS. 11A and 11B are a flowchart illustrating the density detection executed by the CPU 301. Of the steps illustrated in FIGS. 11A and 11B, steps that are the same as the steps in FIG. 10 are given the same reference signs, and the previous descriptions are assumed to apply thereto as well.

Density Detection for Achromatic Colors (Black)

The CPU 301 obtains the detection level of the base material by executing steps S1001 to S1004. The CPU 301 then moves the sequence to step S1100.

In step S1100, the CPU 301 determines whether or not the detection level is greater than or equal to the threshold th2. This determination process is a process for determining the degree of wear of the intermediate transfer belt 7. When the detection level is greater than or equal to the threshold th2, the CPU 301 moves the sequence to step S1101 while keeping the current gain (10×). On the other hand, when the detection level is not greater than or equal to the threshold th2, the CPU 301 moves the sequence to step S1120. In step S1120, the CPU 301 increases the gain of the gain adjustment unit 79. In other words, the CPU 301 sets the gain of the gain adjustment unit 79 to 20×.

In step S1101, the CPU 301 controls the image forming apparatus 100 to form the first density pattern 801, for achromatic colors, on the intermediate transfer belt 7. The CPU 301 controls the generating unit 302 to output an image signal corresponding to the first density pattern 801 to the drive circuits 303*a* to 303*d*.

In step S1102, the CPU 301 detects the first density pattern 801 using regularly-reflected light. The CPU 301 detects the regularly-reflected light from the first density pattern 801 using the PD 73. In step S1103, the CPU 301 determines the correction amount for the density of achromatic colors (black) on the basis of the detection result for the first density pattern 801.

Density Detection for Chromatic Colors

In step S1104, the CPU 301 sets the sensitivity (G2correct) for the PD 74 in the register 76. G2correct is set in the sensitivity adjustment unit 78 of the PD 74 through the register 76. Note that G2correct is a setting value determined at the time of shipment from the factory and stored in the ROM 75.

In step S1105, the CPU 301 sets the gain (10×) for the PD 74. The CPU 301 sets 10× in the gain switching circuit 94 of the gain adjustment unit 80 through the register 76.

In step S1106, the CPU 301 controls the motor 96 to close the shutter member 86, and causes the PD 74 to detect the diffuse light from the diffuse light reference plate 87 provided in the shutter member 86. The CPU 301 turns the LED 71 off and turns the LED 72 on. Through this, the PD 74 can detect the diffuse light from the diffuse light reference plate 87.

In step S1107, the CPU 301 determines whether or not the detection level for the diffuse light is greater than or equal to a threshold th3. In other words, the CPU 301 determines the amount of toner adhering to the surface of the molded lens 84 (a degree of soiling) on the basis of the detection level of the diffuse light. When the detection level is greater than or equal to the threshold th3, the molded lens 84 is less soiled, and the CPU 301 therefore moves the sequence to step S1108. However, when the detection level is not greater than or equal to the threshold th3, the molded lens 84 is more soiled, and the CPU 301 therefore moves the sequence to step S1130. In step S1130, the CPU 301 increases the gain for the PD 74 from 10× to 20×. For example, the CPU 301 sets 20× in the gain switching circuit 94 of the gain adjustment unit 80 through the register 76.

In step S1108, the CPU 301 controls the image forming apparatus 100 to form the second density pattern 802, for chromatic colors, on the intermediate transfer belt 7. The CPU 301 controls the generating unit 302 to output an image signal corresponding to the second density pattern 802 to the drive circuits 303*a* to 303*d*.

In step S1109, the CPU 301 controls the motor 96 to open the shutter member 86, and detects the second density pattern 802 using diffuse light. The CPU 301 turns off the LED 71, turns on the LED 72, and uses the PD 74 to detect the diffuse light from the second density pattern 802. In step S1110, the CPU 301 determines the correction amount for the density of chromatic colors on the basis of the detection result for the second density pattern 802.

In step S1111, the CPU 301 determines whether the density detection has been completed for all three chromatic colors (Y, M, and C). When the density detection has not been completed for any one of the chromatic colors, the CPU 301 returns the sequence to step S1104 and executes the density detection for the next chromatic color. However, when the density detection has been completed for all of the chromatic colors, the CPU 301 stores the respective correction amounts for Y, M, C, and K in the memory 306, and uses the correction amounts to form a user image on the sheet S.

Technical Spirit Derived from Embodiments

As illustrated in FIG. 1, the photosensitive members 1*a* to 1*c* are an example of a first image carrier. The image forming units Pa to Pc are an example of a first image forming unit that forms a toner image of a chromatic color on the first image carrier. The photosensitive member 1*d* is an example of a second image carrier. The image forming unit Pd is an example of a second image forming unit that forms a toner image of an achromatic color on the second image carrier. The intermediate transfer belt 7 is an example of a transfer member onto which the toner image of a chromatic color and the toner image of an achromatic color are transferred. The optical sensor 70 is an example of a detection unit that detects a toner pattern transferred onto the transfer member. The control unit 50 is an example of a control unit that controls the detection unit. The color shift detection illustrated in FIG. 10 is an example of a color shift detection mode that detects an amount of color shift, the amount of color shift indicating a shift between a position of the toner image of the chromatic color and a position of the toner image of the achromatic color on the transfer member. The density detection illustrated in FIGS. 11A and 11B is an example of a density detection mode that detects a density of the toner image of the chromatic color and a density of the toner image of the achromatic color on the transfer member.

The LED 71 illustrated in FIG. 2 is an example of a first light-emitting element. The LED 72 is an example of a second light-emitting element. The PD 73 is an example of a first light-receiving element. The PD 73 is disposed so as to receive regularly-reflected light, which is light output from the first light-emitting element and regularly reflected by a measurement target object (object to be measured), and to receive diffuse light, which is light output from the second light-emitting element and diffused by the measurement target object. The sensitivity adjustment unit 77 is an example of a first adjustment unit that adjusts a sensitivity of the first light-receiving element. The gain adjustment unit 79 is an example of a second adjustment unit that adjusts an amplification rate of the first light-receiving element.

The sensitivity adjustment unit 77 is configured to adjust the sensitivity of the first light-receiving element in accordance with an individual difference of the first light-receiving element in the color shift detection mode and the density detection mode. For example, the sensitivity of the first light-receiving element may be adjusted on the basis of a sensitivity setting value set at the time of shipment from the factory. The gain adjustment unit 79 is configured to adjust the amplification rate of the first light-receiving element in accordance with fluctuations in the detection environment of the detection unit in the color shift detection mode and the density detection mode. “Fluctuations in the detection environment” refers to, for example, wear of the intermediate transfer belt 7, the optical sensor 70 being soiled by toner, and the like. The present embodiment has such features, and as such, the present embodiment can detect regularly-reflected light and diffuse light more accurately than in the past.

The CPU 301 functions as a determination unit that determines whether or not a fluctuation has occurred in the detection environment on the basis of a level of an output signal output by the first light-receiving element when, in the color shift detection mode, the first light-emitting element is turned on and the second light-emitting element is turned off. When it is determined that a fluctuation has occurred in the detection environment, the control unit 50 may control the first image forming unit and the second image forming unit to form a first color shift detection pattern (the first pattern 601). In this case, the control unit 50 turns the first light-emitting element on and the second light-emitting element off, and detects color shift on the basis of a detection result for the first color shift detection pattern from the first light-receiving element. There may also be cases where it is not determined that a fluctuation has occurred in the detection environment. In such a case, the control unit 50 controls the first image forming unit and the second image forming unit to form a second color shift detection pattern (e.g., the second pattern 602). The control unit 50 turns the first light-emitting element off and the second light-emitting element on, and detects color shift on the basis of a detection result for the second color shift detection pattern from the first light-receiving element. In this manner, the test pattern may be switched when a fluctuation has occurred in the detection environment and when a fluctuation has not occurred in the detection environment. This makes it possible to obtain an appropriate detection result in accordance with the detection environment.

As illustrated in FIG. 6A, the first color shift detection pattern may include a chromatic color pattern and an achromatic color pattern formed at a distance from each other. As illustrated in FIG. 6B, the second color shift detection pattern may include a chromatic color (e.g., magenta) pattern, and an achromatic color (e.g., black) pattern formed in contact with the chromatic color pattern. In particular, employing the latter pattern makes it possible to detect a black image formation position even when detecting diffuse light.

The CPU 301 may determine that a fluctuation has not occurred in the detection environment when the level of the output signal output by the first light-receiving element is greater than or equal to a first threshold. The threshold th1 is an example of the first threshold. The CPU 301 may determine that a fluctuation has occurred in the detection environment when the level of the output signal output by the first light-receiving element is not greater than or equal to a first threshold. The amount of regularly-reflected light from the base material of the intermediate transfer belt 7 decreases as wear on the intermediate transfer belt 7 increases. Accordingly, focusing on the level of the output signal from the light-receiving element makes it possible to grasp fluctuations in the detection environment.

The second adjustment unit (the gain adjustment unit 79) may set the amplification rate of the first light-receiving element to a first amplification rate when determining a fluctuation in the detection environment. G1correct is an example of the first amplification rate. When it is not determined that a fluctuation has occurred in the detection environment, the gain adjustment unit 79 keeps the amplification rate of the first light-receiving element at the first amplification rate. On the other hand, when it is determined that a fluctuation has occurred in the detection environment, the gain adjustment unit 79 sets the amplification rate of the first light-receiving element to a second amplification rate (e.g., 200×) that is higher than the first amplification rate (e.g., 10×). Through this, the amplification rate is set appropriately in accordance with fluctuations in the detection environment, and an accurate detection result is obtained.

There are cases where the level of the output signal output by the first light-receiving element is greater than or equal to the first threshold and greater than or equal to a second threshold. In this case, the CPU 301 may keep the amplification rate of the first light-receiving element at the first amplification rate. The threshold th2 is an example of the second threshold. There are also cases where the level of the output signal output by the first light-receiving element is greater than or equal to the first threshold but is not greater than or equal to the second threshold. In such a case, the CPU 301 may set the amplification rate of the first light-receiving element to a third amplification rate (e.g., 20×) that is higher than the first amplification rate and lower than the second amplification rate. This makes it possible to continue detecting the first pattern 601 using the regularly-reflected light.

The measurement target object when detecting fluctuations in the detection environment is a surface of the transfer member on which no toner image is formed. This makes it possible to accurately detect the degree of wear of the transfer member.

The PD 74 is an example of a second light-receiving element disposed so as to receive diffuse light, which is light output from the second light-emitting element and diffused by the measurement target object, in the density detection mode. The sensitivity adjustment unit 78 is an example of a third adjustment unit that adjusts a sensitivity of the second light-receiving element in the density detection mode. The gain adjustment unit 80 is an example of a fourth adjustment unit that adjusts an amplification rate of the second light-receiving element in the density detection mode. The third adjustment unit is configured to adjust the sensitivity of the second light-receiving element in accordance with an individual difference of the second light-receiving element. The fourth adjustment unit is configured to adjust the amplification rate of the second light-receiving element in accordance with a fluctuation in the detection environment of the detection unit. This makes it possible to independently adjust for individual differences and the detection environment, for the light-receiving element used to detect the density.

In the density detection mode, the control unit 50 may turn the first light-emitting element on, turn the second light-emitting element off, and determine the amplification rate of the first light-receiving element in accordance with the level of the output signal output by the first light-receiving element. Furthermore, the control unit 50 may cause the second image forming unit to form an achromatic color pattern for detecting the density of the achromatic color toner image, and may cause the first light-receiving element to receive diffuse light from the achromatic color pattern. The first density pattern 801 is an example of the achromatic color pattern. The control unit 50 may turn the second light-emitting element on, turn the first light-emitting element off, and determine the amplification rate of the second light-receiving element in accordance with the level of the output signal output by the second light-receiving element. The control unit 50 may cause the first image forming unit to form a chromatic color pattern for detecting the density of the chromatic color toner image, and may cause the second light-receiving element to receive diffuse light from the chromatic color pattern. The second density pattern 802 is an example of the chromatic color pattern.

In the density detection mode, when determining the amplification rate of the first light-receiving element, the first light-receiving element receives regularly-reflected light from the surface of the transfer member. In the density detection mode, when determining the amplification rate of the second light-receiving element, the second light-receiving element may receive diffuse light from a predetermined reference member. The diffuse light reference plate 87 is an example of the predetermined reference member. Through this, the amplification rate of the second light-receiving element is determined accurately.

The shutter member 86 is an example of a protective member that can be moved between a protective position, in which the detection unit can be protected from soiling, and an open position, in which the detection unit is not protected from soiling. The motor 96 is an example of a movement unit (an actuator) that moves the protective member. As illustrated in FIG. 2, the predetermined reference member may be provided on the protective member. When the amplification rate of the second light-receiving element is determined, the movement unit causes the protective member to remain in the protective position. This makes it possible to detect diffuse light from the reference member provided on the protective member. When the amplification rate of the first light-receiving element is determined, the movement unit causes the protective member to move to the open position. As a result, the optical sensor 70 can receive regularly-reflected light from the base material of the intermediate transfer belt 7. Providing the shutter member 86 makes it difficult for the optical sensor 70 to be soiled.

The third adjustment unit (e.g., the sensitivity adjustment unit 78) may be configured to adjust the sensitivity of the second light-receiving element on the basis of a fixed value that is based on an individual difference of the second light-receiving element. This makes it possible to appropriately correct the individual difference of the second light-receiving element. The first adjustment unit may be configured to adjust the sensitivity of the first light-receiving element on the basis of a fixed value that is based on an individual difference of the first light-receiving element. This makes it possible to appropriately correct the individual difference of the first light-receiving element.

When the first light-receiving element receives regularly-reflected light from the measurement target object, the second adjustment unit may set the sensitivity of the first light-receiving element to a first sensitivity (e.g., 10×). When the first light-receiving element receives diffuse light from the measurement target object, the second adjustment unit may set the sensitivity of the first light-receiving element to a second sensitivity (e.g., 200×) that is higher than the first sensitivity. This makes it possible to appropriately detect regularly-reflected light and diffuse light using a single light-receiving element.

An amplification rate of a second amplifier circuit provided in the second adjustment unit may be higher than an amplification rate of a first amplifier circuit provided in the first adjustment unit. The first adjustment unit is a unit that corrects variations among a plurality of light-receiving elements, and therefore does not require a very high amplification rate. On the other hand, the second adjustment unit corrects for differences between regularly-reflected light and diffusely-reflected light, and therefore requires a high amplification rate.

An amplification rate of a fourth amplifier circuit provided in the fourth adjustment unit may be higher than an amplification rate of a third amplifier circuit provided in the third adjustment unit. The third adjustment unit is a unit that corrects variations among a plurality of light-receiving elements, and therefore does not require a very high amplification rate. On the other hand, the fourth adjustment unit corrects for differences between regularly-reflected light and diffusely-reflected light, and therefore requires a high amplification rate.

An amplification rate of an amplifier circuit provided in the third adjustment unit may be higher than an amplification rate of an amplifier circuit provided in the first adjustment unit. For example, there are cases where an incident angle of light on the PD 74 (e.g., −18 degrees) is greater than an incident angle of light on the PD 73 (e.g., −7 degrees). In this case, it is necessary to set the amplification rate of the PD 74 to be higher than the amplification rate of the PD 73.

The LED 71 is an example of a first light-emitting element provided on a predetermined surface of the substrate. The board 83 is an example of a substrate having a predetermined surface facing an object to be measured. A measurement target on a surface opposite the predetermined surface is irradiated with light from the first light-emitting element. That is, the first light-emitting element emits light to an object to be measured. The predetermined surface faces the object to be measured. The LED 72 is an example of a second light-emitting element provided on the predetermined surface of the substrate. A measurement target (e.g., a measurement image) on a surface opposite the predetermined surface is irradiated with light from the second light-emitting element. The measurement target may be called as an object to be measured. That is, the second light-emitting element emits light to the object to be measured. The predetermined surface faces the object to be measured. The PD 73 is an example of a light-receiving element provided on the predetermined surface of the substrate. The light-receiving element receives reflected light (e.g. regularly-reflected light) from the measurement target when the measurement target is irradiated with light from the first light-emitting element. The light-receiving element receives reflected light (e.g. diffusely-reflected light) from the measurement target when the measurement target is irradiated with light from the second light-emitting element. The light-receiving element outputs an output value on the basis of a light receiving result from the light-receiving element. The amplifier circuit OP1 is an example of a first amplifier circuit that amplifies the output value output from and/or by the light-receiving element. The amplifier circuit OP3 is an example of a second amplifier circuit that amplifies the output value amplified by the first amplifier circuit.

The first amplifier circuit may include the electronic volume 91 used to amplify the output value. The second amplifier circuit may include a plurality of resistors used to amplify the output value amplified by the first amplifier circuit and the gain switching circuit 93 that switches the plurality of resistors.

The first amplifier circuit may amplify the output value on the basis of a first amplification rate. The second amplifier circuit may amplify the output value amplified by the first amplifier circuit on the basis of a second amplification rate. A number of a plurality of amplification rates selectable as the first amplification rate is greater than a number of a plurality of amplification rates selectable as the second amplification rate.

The PD 74 is an example of a second light-receiving element provided on the predetermined surface of the substrate. The second light-receiving element receives diffusely-reflected light from the measurement target when the measurement target is irradiated with light from the second light-emitting element. The amplifier circuit OP2 is an example of a third amplifier circuit that amplifies an output value from the second light-receiving element. The amplifier circuit OP4 is an example of a fourth amplifier circuit that amplifies the output value amplified by the third amplifier circuit.

The image forming unit Pa is an example of a first image forming unit that forms an image of a first color. The image forming unit Pb is an example of a second image forming unit that forms an image of a second color different from the first color. The intermediate transfer belt 7 is an example of a transfer member onto which the image of the first color and the image of the second color are transferred. The inner roller 8 and the outer roller 9 are an example of a transfer unit that transfers the image on the transfer member onto a sheet.

The CPU 301 is an example of a controller. The controller causes the first image forming unit to form a first measurement image, causes the optical sensor to measure the first measurement image, and controls a density of the image formed by the first image forming unit on the basis of a first output value corresponding to a measurement result of the first measurement image amplified by the second amplifier circuit. The controller causes the second image forming unit to form a second measurement image, causes the optical sensor to measure the second measurement image, and controls a density of the image formed by the second image forming unit on the basis of a second output value corresponding to a measurement result of the second measurement image amplified by the second amplifier circuit. The controller causes the first image forming unit and the second image forming unit to form a plurality of measurement images, causes the optical sensor to measure the plurality of measurement images, and controls a registration on the basis of a third output value corresponding to a measurement result of the plurality of measurement images amplified by the second amplifier circuit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-080691, filed Apr. 30, 2020 which is hereby incorporated by reference herein in its entirety.

What is claimed is:

1. An optical sensor comprising:

a substrate, having a predetermined surface facing an object to be measured;

a first light-emitting element provided on the predetermined surface of the substrate, wherein the first light-emitting element emits light to the object to be measured;

a second light-emitting element provided on the predetermined surface of the substrate, wherein the second light-emitting element emits light to the object to be measured;

a light-receiving element provided on the predetermined surface of the substrate, the light-receiving element receiving reflected light from the object to be measured and outputting an output value on the basis of a light receiving result of the light-receiving element;

a first amplifier circuit configured to amplify the output value output from the light-receiving element; and a second amplifier circuit configured to amplify the output value amplified by the first amplifier circuit, wherein the first amplifier circuit includes an electronic volume to amplify the output value from the light-receiving element, and the second amplifier circuit includes a plurality of resistors to amplify the output value amplified by the first amplifier circuit and a switching circuit to switch the plurality of resistors.

2. The optical sensor according to claim 1, wherein the first amplifier circuit amplifies the output value on the basis of a first amplification rate, the second amplifier circuit amplifies the output value amplified by the first amplifier circuit on the basis of a second amplification rate, and a number of a plurality of amplification rates selectable as the first amplification rate is greater than a number of a plurality of amplification rates selectable as the second amplification rate.

3. The optical sensor according to claim 1, further comprising:

another light-receiving element provided on the predetermined surface of the substrate, the another light-receiving element receiving diffusely-reflected light from the object to be measured when the object to be measured is irradiated with light from the second light-emitting element;

a third amplifier circuit configured to amplify an output value from the another light-receiving element; and a fourth amplifier circuit configured to amplify the output value amplified by the third amplifier circuit.

4. The optical sensor according to claim 1, wherein the light-receiving element receives regularly-reflected light from the object to be measured when the object to be measured is irradiated with light from the first light-emitting element, wherein the light-receiving element receives diffusely-reflected light from the object to be measured when the object to be measured is irradiated with light from the second light-emitting element.

5. An image forming apparatus comprising:

a first image forming unit configured to form an image of a first color;

a second image forming unit configured to form an image of a second color different from the first color;

a transfer member, wherein the image of the first color and the image of the second color are transferred on the transfer member;

a transfer unit configured to transfer the images on the transfer member onto a sheet;

an optical sensor including:

a substrate having a predetermined surface opposing the transfer member, a first light-emitting element provided on the predetermined surface of the substrate, wherein the first light-emitting element emits light to a measurement image on the transfer member, a second light-emitting element provided on the predetermined surface of the substrate, wherein the second light-emitting element emits light to the measurement image on the transfer member, a light-receiving element provided on the predetermined surface of the substrate, the light-receiving element receiving reflected light from the measurement image, the light-receiving element outputting an output value on the basis of a light receiving result of the light-receiving element, a first amplifier circuit configured to amplify the output value from the light-receiving element, and a second amplifier circuit configured to amplify the output value amplified by the first amplifier circuit; and a controller configured to:

control the first image forming unit to form a first measurement image, control the optical sensor to measure the first measurement image, and control a density of an image to be formed by the first image forming unit on the basis of a first output value corresponding to a measurement result of the first measurement image amplified by the second amplifier circuit, control the second image forming unit to form a second measurement image, control the optical sensor to measure the second measurement image, and control a density of an image to be formed by the second image forming unit on the basis of a second output value corresponding to a measurement result of the second measurement image amplified by the second amplifier circuit, and control the first image forming unit and the second image forming unit to form a plurality of measurement images, control the optical sensor to measure the plurality of measurement images, and control a color registration on the basis of third output values corresponding to measurement results of the plurality of measurement images amplified by the second amplifier circuit, wherein the first amplifier circuit includes an electronic volume to amplify the output value from the light-receiving element, and the second amplifier circuit includes a plurality of resistors to amplify the output value amplified by the first amplifier and a switching circuit to switch the plurality of resistors.

6. The image forming apparatus according to claim 5, wherein the first amplifier circuit amplifies the output value of the light-receiving element on the basis of a first amplification rate, the second amplifier circuit amplifies the output value amplified by the first amplifier on the basis of a second amplification rate, and a number of a plurality of amplification rates selectable as the first amplification rate is greater than a number of a plurality of amplification rates selectable as the second amplification rate.

7. The image forming apparatus according to claim 5, further comprising:

another light-receiving element provided on the predetermined surface of the substrate, the other light-receiving element receiving diffusely-reflected light from the measurement image when the measurement image is irradiated with light from the second light-emitting element;

a third amplifier circuit that amplifies an output value from the other light-receiving element; and a fourth amplifier circuit that amplifies the output value amplified by the third amplifier circuit.

8. The image forming apparatus according to claim 5, wherein the light-receiving element receives regularly-reflected light from the measurement image when the measurement image is irradiated with light from the first light-emitting element, wherein the light-receiving element receives diffusely-reflected light from the measurement image when the measurement image is irradiated with light from the second light-emitting element.

* * * * *